July 28, 1959
E. H. VOIGTMAN
2,897,109
PLASTIC FILM PRODUCT
Filed May 31, 1955
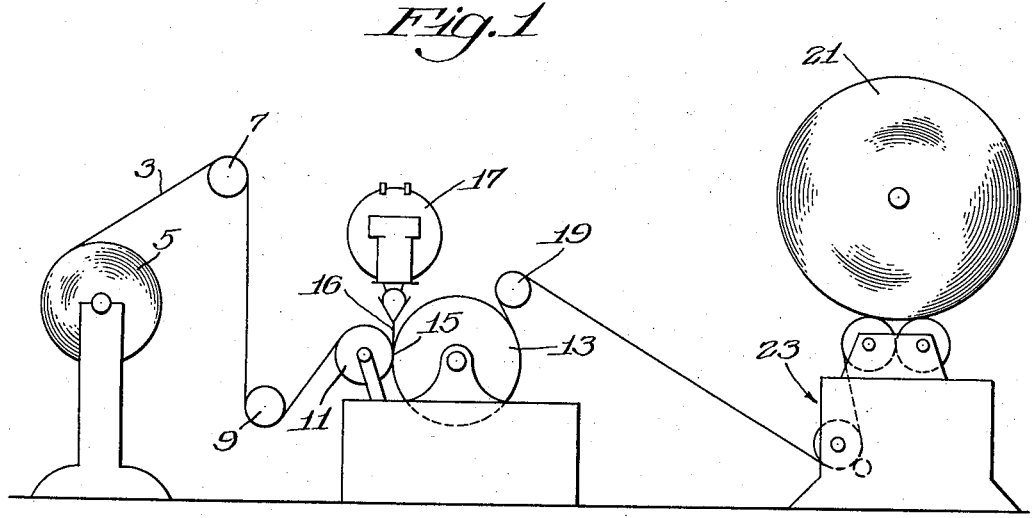
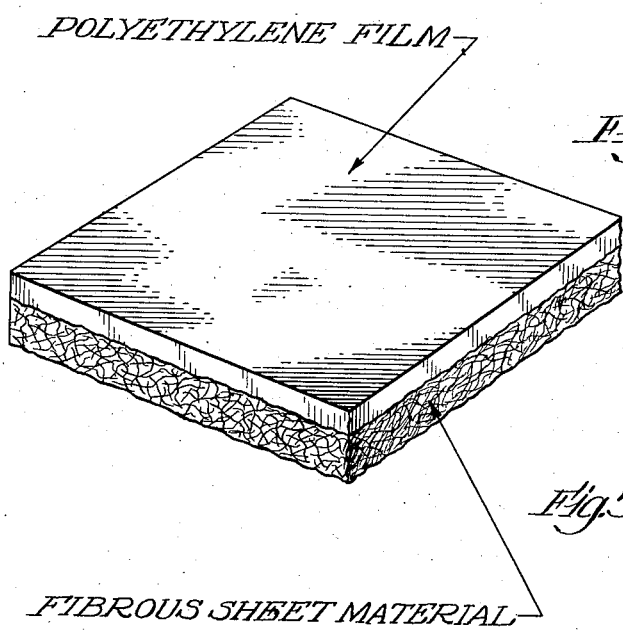
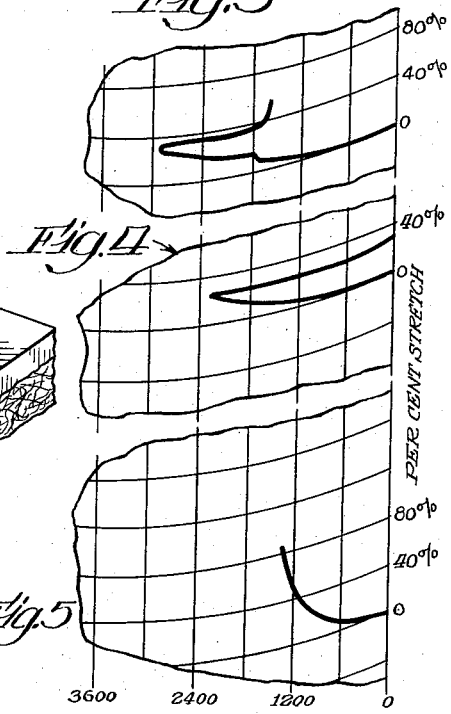
INVENTOR.
Edward H. Voigtman
BY
Soans, Glaister & Anderson
Attys.

United States Patent Office 2,897,109
Patented July 28, 1959

2,897,109

PLASTIC FILM PRODUCT

Edward H. Voigtman, Neenah, Wis., assignor, by mesne assignments, to Kimberly-Clark Corporation, a corporation of Delaware Application May 31, 1955, Serial No. 511,932

3 Claims. (Cl. 154—50)

The present invention relates, in general, to an improved plastic film product.

Several types of plastic films have been and are being used for many purposes and, in this connection, films of polyethylene, polyvinylidine chloride (polymer or copolymer), polyvinyl alcohol, and polyvinyl acetate have been widely employed for packaging, box liners, and many other purposes. Such films are particularly desirable because they are water resistant, moisture proof, and grease resistant, and they have many advantages in the food field as well as other fields because they are, in general, nontoxic, tasteless and odorless. Moreover, certain of the films may be adhered together with facility, thereby providing a readily apparent advantage over various other packaging materials which necessarily require adhesives for sealing purposes.

However, these and other advantages of the aforementioned plastic films have been off-set, in part, because of their relatively high cost and short supply which have resulted from their general adaptability to a wide variety of uses. In order to supply the large demand and to economize on the cost of film, the films have been made and used as thin as posible. However, films which are less than about 1.5 mils in thickness, although having substantially the same utility from the standpoint of water, moisture and grease resistance as thicker films, do not have sufficient body, and consequently lose their handleability and commercial usefulness. In this connection, the thin films pick up static electrical charges so that they become distorted, tend to "ball-up," and stick to surfaces. As a result, their handleability in manufacture and in equipment wherein the film is utilized, i.e. converting equipment, is very difficult. Furthermore, the thin films are difficult to heat seal and tend to shrivel upon the application of heat. Since heat sealing is necessary in achieving wide utilization of thin films, the difficulty with heat sealing inherently limits the utility of thin films.

Thin films, which as above indicated, are more economical and at the same time useful for many purposes, are also desirable for other reasons. For example, various packaged food materials, such as cheese, produce carbon dioxide gas during manufacture or storage, and it is considered desirable to permit removal of this gas while at the same time substantially preventing air from entering the package. Thin films of polyethylene and certain other plastic materials are particularly suitable for this purpose for the reason that the gas permeability of thin films to oxygen and nitrogen, the major components of air, is much less than to carbon dioxide so that the carbon dioxide is permitted to escape from the package without letting substantial amounts of air into the package. By way of example, the gas permeability of the polyethylene film of 1 mil thickness to carbon dioxide gas is 20 times greater than it is to nitrogen and 5 times greater than it is to oxygen.

While thin films have been previously coated and cast onto various fibrous materials, such as paper, fabric, etc., the resulting product acquires the handleability and many of the physical characteristics of the fibrous material. That is to say, the thin film loses certain of its own characteristics, such as drape and flexibility, and the resulting product takes on many of the characteristics of the fibrous material. For example, thin films have been applied to kraft paper to provide grease and moisture resistance, and the resulting coated paper has, in general, the same handleability as kraft paper. There has not been provided, heretofore, a thin film product having its own desirable handleability characteristics.

A general disadvantage of thin plastic films for commercial purposes, and particularly for packaging purposes, is the difficulty in obtaining a firm bond between the films and board, paper, or other surfaces. In this connection, it has been found that most presently known adhesives either do not effect a firm bond or else react with the film in such a manner that its usefulness is impaired.

A disadvantage of plastic film is that presently known films are undesirable for uses which require the films to touch the human body because of their clammy feel. Therefore, even though their flexibility, moisture resistance and other characteristics make them desirable for many uses, they have been found undesirable for uses which require the films to touch the body.

Accordingly, the principal object of the present invention is the provision of an improved plastic film which overcomes the foregoing and other deficiencies of presently known films. As will become more apparent hereinafter, this and other objects of the invention are accomplished by combining a thin plastic film having a thickness of less than about 1.5 mils with a weak web of fibrous material, the web of fibrous material having substantially the same desirable handleability characteristics as the plastic film.

The accompanying drawing illustrates various aspects of the invention, and in this drawing:

Figure 1 illustrates, diagrammatically, apparatus for manufacturing the improved thin plastic film product of the invention;

Figure 2 is a perspective view of the improved film product of the invention;

Figure 3 is a typical graph of the tensile characteristics of an improved plastic film product of the invention, the amount of tension being plotted along the axis of abscissas and the percent of stretch being plotted along the axis of ordinates. For this graph, the tension is applied in the machine direction of the web of fibrous material and the curve plotted through the point where the product loses its useful properties;

Figure 4 is a graph similar to that shown in Figure 3, the graph being of the web of fibrous material used in making the film product of the previous figure. This graph shows the entire tensile characteristics of the fibrous web; and Figure 5 is a graph similar to that shown in Figure 4, the graph being of the thin film portion of the product used for the graph shown in Figure 3. The graph shows the character of the film through the point where it loses its elastic memory.

As before indicated, the invention contemplates combining a thin plastic film, i.e. a film having a thickness of less than about 1.5 mils, with a weak fibrous web having substantially the same desirable handleability characteristics as the plastic film. The film employed is preferably thermoplastic but, in any event, should be a plastic material capable of being temporarily softened or activated, as by heating or the addition of an activating solvent, and hardened to a film, as by cooling or drying, the hardened film having substantially the same properties as the film prior to being activated. Such film may be any one of the polyethylene, polyvinylidene chloride (polymer or copolymer), polyvinyl alcohol, and polyvinyl acetate films mentioned in the foregoing, or may be made of polyvinyl chloride acetate, polymeric amide, or rubber hydrochloride.

The plastic film may be from .15 to 1.5 mils in thickness, though for most commercially satisfactory thin film embodiments the film will be from .33 to .9 mil in thickness. In general, films which are less than .15 mil in thickness lose their continuity and consequently certain of their functional properties such as gas impermeability. On the other hand, films more than 1.5 mils in thickness are too expensive and these thicker films have sufficient body, strength, and tear resistance for most commercial purposes. Such thick films can be satisfactorily handled on converting equipment and can be more readily heat sealed.

If a hydrophilic fiber, such as a cellulosic fiber, is used, the fiber side of the film will have an absorbent surface, while on the other hand, if a hydrophobic fiber is used, such as glass fiber, the fiber surface will not be water absorbent but the fibers will retain their strength in aqueous mediums. Thus, it will be apparent that the type of fiber employed will, in large part, be dependent upon the use to which the film may be placed.

It is important that the web of fibrous material be weak and should correspond in strength and handleability characteristics with the characteristics of the thin film. I have found that with webs having substantial strength characteristics, such as kraft paper, the desirable handleability characteristics of the film are lost, and the resulting product has the predominating characteristics of the stronger web. I have also found that in order to provide the product of the invention, the fibrous material should have some stretchability without fracture of the web. By creping or embossing of a light weight fibrous web, a relatively weak web having substantial stretch can be provided.

Creping of the web not only provides the foregoing advantages but, in addition, permits improved combining of the fibrous web with the thin plastic film. In this connection, creping of the fibrous web causes fibers to be more available for combining with the thin film. While it is important that the fibers be embedded in the film, it is also important that the fibers do not extend through the film. In the latter connection, if the fibers extend through the film, the continuity of the film is broken and many of its desirable characteristics are impaired. Thus, the strength of the film is decreased as well as the resistance of the film to water and moisture.

The weak fibrous web combined with the thin film has a weight of between about 4 and about 12 pounds per 3000 square feet, before creping. The web should be creped to provide stretchability, as previously pointed out, and in order to provide the desirable features of this invention, the crepe ratio, i.e. the ratio of the length of the web prior to creping and the length of the web after creping, should be between about 1.05 and about 2.3. (Alternatively expressed as from 5% to 130% stretch.) In combining the web to the thin film, some reduction in crepe ratio may occur, and therefore, the ratio specified is that of the web after combining to the thin film. The weight of the fibrous web used is, in general, proportional to the thickness of the thin film, heavier webs being utilized with thicker films.

As indicated, various methods may be employed for manufacturing the improved film product of the invention. However, in order to permit stretch of the film and web, and most satisfactory coaction between the film and web, a creped web having the desired crepe and weight is first formed and combined with the film. In this connection, the weak web is pressed into a viscous film while simultaneously hardening the face of the film opposite from the face which receives the web. As a result of the establishment of the differential viscosity characteristics between the face of the film, the web may be combined with the viscous face of the film under high pressure but, at the same time, the fibers of the web do not penetrate the opposite face. Even under such combining conditions, only the crepe apices appear to combine with the film. It is believed that this combination provides the coaction between the film and web.

The method may be practiced on the apparatus which is shown diagrammatically in Figure 1 of the drawing. As shown therein, a weak creped web 3 is supplied from a roll 5 which passes over a pair of stretch rolls 7 and 9 to a soft rubber roll 11. The soft rubber roll 11 is pressed against a smooth chrome surfaced roll 13 which is at a substantially lower temperature than the rubber roll 11, and these rolls provide a nip 15 through which the loose web 3 is drawn from the supply roll 5.

A film 16 of plastic is provided by an extruder 17 and the film enters the nip 15 in a viscous condition with the web 3. In the nip 15, the web 3 is forced through one face of the viscous film 16, the web combining with the film, and, simultaneously, the other face of the film 16 is cooled by the chrome roll 13 preventing the fibers from extending through or penetrating this face.

The improved film product of the invention leaves the nip 15, passes around the surface of the chrome roll 13 to permit the film to cool, and the film is taken from the roll 13 over take-off roll 19. From the take-off roll 19 the film product is wound up on a take-up reel 21 which is carried on a conventional two-drum type winder 23 in the illustrated apparatus.

In satisfactory operation of the illustrated apparatus with polyethylene films of less than 1 mil thickness the rubber roll is pressed against the chrome roll so as to establish a maximum pressure in the nip 15 between about 75 and 200 pounds per square inch and the chrome surfaced roll 13 is at between about 50° F. and about 140° F. to provide satisfactory hardening of one film surface, to take up the heat from the film product prior to its being removed from this roll, and to prevent the film from sticking to the roll. The rubber roll 11 is operated at a temperature which is about 100° F. above that of the chrome roll 13.

The film leaving the extruder may be of the desired thickness or it may be stretched to the desired thickness while unsupported between the extruder 17 and nip 15 if the extruder provides a film which is too thick. Under the above specified condition, the web is combined with the film along the apices of the crepe and the valleys between the apices are uncombined with the film. Accordingly, the web may stretch intermediate the points of attachment to provide the desirable features of this invention.

As a specific example of a film product of the invention made on the above apparatus, a loose, creped web of cellulosic tissue was prepared, the web having a basis weight, on a bone dry basis, of 10.3 pounds per ream of three thousand square feet, after creping. This web had a crepe ratio of about 1.12 when passed over the rubber roll 11 and had an average thickness of 2.5 mils. The plastic film, when applied to the web, had a thickness of .6 mil (calculated by dividing the weight of film by the area of film embedded with fiber) and the improved film product leaving the nip had an average thickness of about 2.8 mils. The thickness of the web and of the product was measured by a standard Cady bulk tester.

The film was usable for packaging cheese, wrapping paint brushes, baby bibs, diapers, wrapping tools, and many other commercial purposes. The resulting film was also adapted for use as a box or bag liner and could easily be attached to box materials by readily available commercial adhesives.

Figure 2 of the drawings illustrates the product of the invention, this figure showing the weak web of material in relation to the thin plastic film.

The remaining figures of the drawings illustrate the unique tensile properties of the product of the invention. Figure 4 illustrates the strength of a weak fibrous web having a basis weight of .8 pounds per three thousand square feet, before creping, and a crepe ratio of 1.16, as a function of its stretchability, while Figure 5 illustrates the same relationship for a polyethylene film having a thickness of .8 mil. On the other hand, Figure 3 illustrates this relationship for the combined product of the invention. It will be seen that the combined product has a curve which is quite distinct from the curve of either of its components. More particularly, it will be seen that the strength of the combined product is materially increased at the lower degrees of stretch as compared to the strength of the film component of the product. This is a distinct advantage in the use of the product of the invention in converting equipment.

The combining of the weak fiber web with the thin film substantially eliminates problems with static electricity so that the thin film may be more readily handled. In addition, it has been found that the combined product does not shrivel when subjected to heat so that it can be readily heat sealed which is a particular advantage of the product over that of thin films.

The product of the invention has good drape and the fibrous side of the product has a cosmetic feel as distinguished from the clammy feel of plastic materials. The fibrous side of the product of the invention may be readily attached to board or paper with conventional aqueous adhesives.

As previously pointed out, the product of the invention is quite distinct from those previously known products which comprised board or paper to which a thin film was coated. In the case of such products, the thin film almost completely loses its drape and flexibility, and the combined product acquires the handleability of the paper or board. This is true even in the case of light weight cellulosic webs which are not creped and, in this connection, uncreped webs, having a weight of 10.5 pounds per ream when combined with thin films do not have the handleability of the product of the invention. Such uncreped webs have tensile strengths which are as much as 8 or 10 times the strength of polyethylene films having a thickness of about .8 mil.

I have found that the strength of the web of fibrous material should not be more than about twice the strength of the thin plastic film with which it is used. While the strength of the fibrous material may be less than the strength of the plastic film, the use of such relatively weak material is not most desirable as it does not provide a product having sufficient strength and body characteristics. Accordingly, the strength of the weak fiber web should not be less than about one-half of the tensile strength of the plastic film.

It is believed that the improved combining of the thin film with the weak web occurs, in part, because of the fact that the product of the invention is made up from materials of corresponding weights. For this reason, improved combining of the film and web occurs. In the manufacture of the product of the invention, the film weight generally exceeds the weight of the web and, in order to achieve most satisfactory combining of these materials, the film weight should about equal or exceed the weight of the web.

As before indicated, an important feature of this invention is the provision of a web having apices which combine with the thin film and having sections intermediate these apices which are not combined with the film. Such combination appears to provide a product having the unusual features of this invention. Accordingly, it is important that the combining operation does not effect a coating or lamination of the film to the web so that the intermediate uncombined sections of web are combined with the film.

Additional plies of tissue may be added to the improved film product for increasing absorbency which is desired for certain purposes and the plies may be adhered together by embossing to provide a cushioning surface which makes the resulting material adaptable for many packaging or other purposes, particularly in view of the liquid or vapor barrier provided by the material.

From the foregoing, it is apparent that a new film product has been provided which is not only more economical than films having similar characteristics but which, in addition, makes possible greater utilization of plastic film now in short supply. Furthermore, the present invention has extended the use of plastic films into fields which have heretofore been considered commercially impracticable. The invention also provides a highly satisfactory commercial method for making the film product described.

This application is a continuation-in-part of my copending application, Serial Number 255,981, which was filed on November 13, 1951, now abandoned, and which has been assigned to the assignee of this invention.

Various features of the invention which are believed to be new are set forth in the following claims.

I claim:

1. An improved plastic film product comprising a plastic film combined with a single sheet of stretchable weak fiber web, the web being creped thereby providing apices on its surface, said product having a stretchability between about 5 and about 130 percent and having substantially the same handleability characteristics as said plastic film, the film having a thickness of between about .15 mil and about 1.5 mils, and the fiber web comprising a cellulosic tissue having a basis weight between about 4 and about 12 pounds per 3000 square feet before creping and having a tensile strength not exceeding about twice the tensile strength of the film and not less than about one-half the tensile strength of the film, said web being bonded to the film substantially only along its apices, whereby said handleability and stretchability are provided to said improved plastic film product, and said bond being effected by fibers of said web which are partially embedded in but do not extend through said plastic film whereby the impermeability of said film is not materially impaired.

2. An improved plastic film product comprising a plastic film combined with a single sheet of stretchable weak fiber web, the web being creped thereby providing apices on its surface, said product having a stretchability between about 5 and about 130 percent and having substantially the same handleability characteristics as said plastic film, the film having a thickness of between about .15 mil and about 1.5 mils, and the fiber web comprising a cellulosic tissue sheet having a basis weight between about 4 and about 12 pounds per 3000 square feet before creping and having a tensile strength not exceeding about twice the tensile strength of the film and not less than about one-half the tensile strength of the film, the fiber web having a crepe ratio between about 1.05 and about 2.3, said web being bonded to the film substantially only along its apices, whereby said handleability and stretchability are provided to said improved plastic film product, and said bond being effected by fibers of said web which are partially embedded in but do not extend through said plastic film whereby the impermeability of said film is not materially impaired.

3. An improved plastic film product comprising a polyethylene film combined with a single sheet of stretchable weak fiber web, the web being creped thereby providing apices on its surface, said product having a stretchability between about 5 and about 130 percent and having substantially the same handleability characteirstics as said plastic film, the film having a thickness of between about .15 mil and about 1.5 mils, and the fiber web comprising a cellulosic tissue sheet having as basis weight between about 4 and about 12 pounds per 3000 square feet before creping and having a tensile strength not exceeding about twice the tensile strength of the film and not less than about one-half the tensile strength of the film, the fiber web having a crepe ratio between about 1.05 and about 2.3, said web being bonded to the film substantially only along its apices whereby said handleability and stretchability are provided to said improved plastic film product, and said bond being effected by fibers of said web which are partially embedded in but do not extend through said plastic film whereby the impermeability of said film is not materially impaired.

References Cited in the file of this patent

UNITED STATES PATENTS

| | | |
|---|---|---|
| 2,020,928 | Asnes | Nov. 12, 1935 |
| 2,485,725 | Francis | Oct. 25, 1949 |
| 2,649,859 | Hermanson et al. | Aug. 25, 1953 |
| 2,679,887 | Doyle et al. | June 1, 1954 |
| 2,686,744 | Cornwell | Aug. 17, 1954 |

FOREIGN PATENTS

| | | |
|---|---|---|
| 877,344 | France | Dec. 3, 1942 |
| 641,568 | Great Britain | Aug. 16, 1950 |
| 726,949 | Great Britain | Mar. 23, 1955 |

OTHER REFERENCES

Modern Plastics article published Dec. 1950, pages 67–71.

Fields: Abstract of app. Ser. No. 153,704, published August 18, 1953; 673, O. G. 837.